United States Patent Office 3,386,097
Patented May 28, 1968

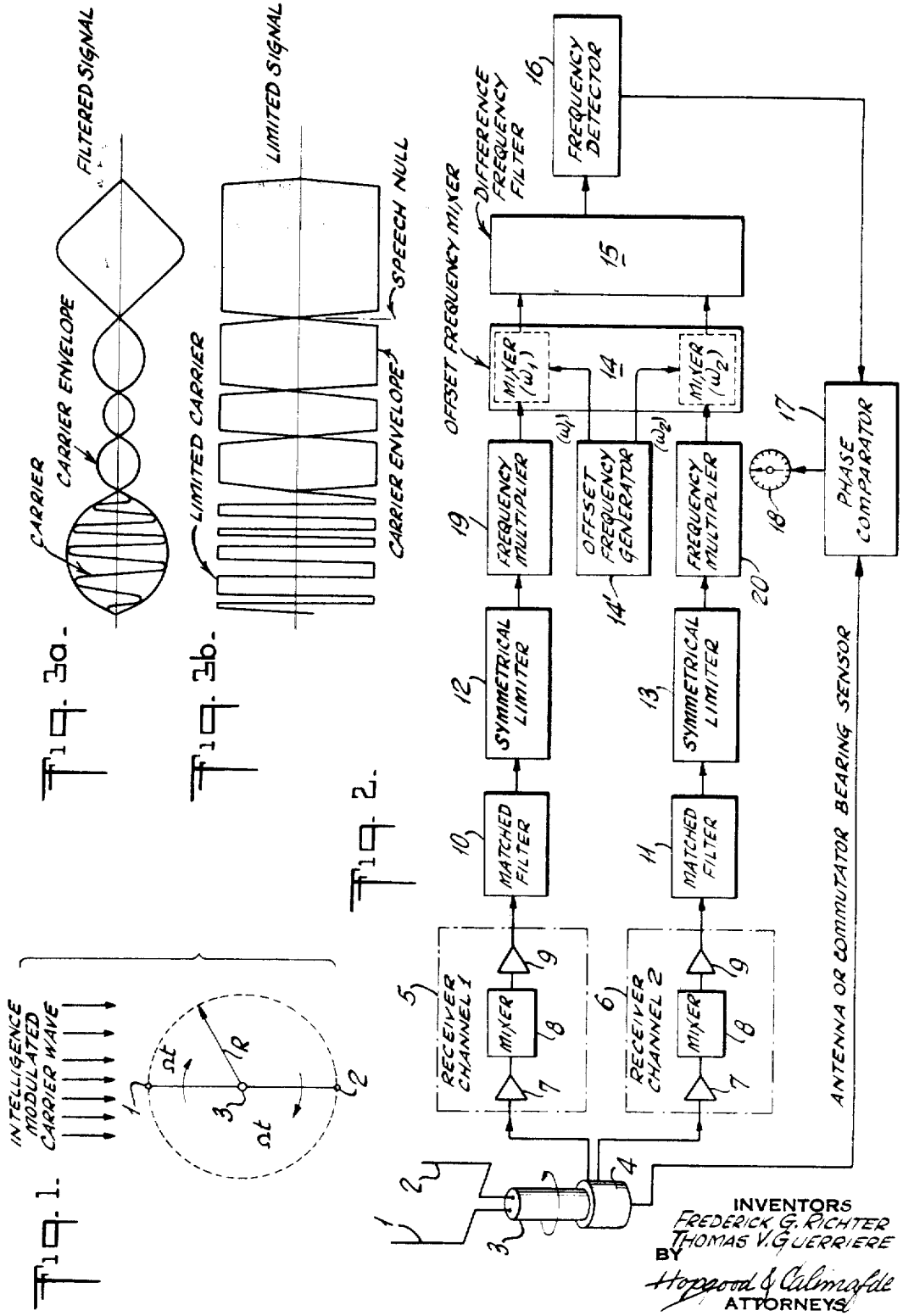

3,386,097
SIGNAL-ENHANCEMENT MEANS FOR DOPPLER-TYPE RADIO DIRECTION FINDERS
Frederick G. Richter, Huntington, and Thomas V. Guerriere, Lake Grove, N.Y., assignors to Servo Corporation of America, Hicksville, N.Y., a corporation of New York
Filed Mar. 10, 1967, Ser. No. 622,311
9 Claims. (Cl. 343—113)

ABSTRACT OF THE DISCLOSURE

In a dual-channel mode of operation of a Doppler-type radio direction finder, opposed-phase use is made of the Doppler-frequency modulation imposed on the incoming signal (in the respective channels) and in-phase use is made of the intelligence or spurious source modulations of the incoming signal. The signals from each channel are processed in an offset-frequency mixer to produce a difference output signal carrier frequency characterized by a Doppler frequency modulation enhanced by a factor of two (2). The extraneous modulation components in frequency and phase advantageously are cancelled. By frequency-multiplying the signals before performing the frequency-differencing function, further enhancement of the Doppler component is achieved.

---

This invention concerns an enhancement technique for wave energy and, in one form, is especially applicable to enhancement of the Doppler-signal component in Doppler radio direction finder (RDF, or DF) systems.

Doppler radio direction finders in general operate on the principle that a radio signal incident upon an antenna moving in a circular path is phase or frequency modulated as a function of the antenna's angular velocity and of the bearing of the signal source from the antenna. A simplified system, by way of illustration, comprises a single vertical rotating antenna, the phase-modulated output of which is heterodyned to a convenient IF and then fed into a discriminator. The latter produces an output which is compared in phase to a base signal derived from the antenna rotation, and the desired measure of the bearing of the incident signal thus is obtained.

In the so-called Quasi-Doppler system, the elements of a circularly disposed array of stationary antennas are connected sequentially to a receiver by a mechanical or an electronic commutator. The point of signal reception is thus moved, as in revolving antenna systems, and the desired frequency or phase modulation of the incoming signal is generated. Further examples and explanations of Doppler-type RDF systems are set out in P. G. Hansel Patent No. 2,481,509, issued Sept. 13, 1959 and in J. M. Beukers Patent No. 3,121,871, issued Feb. 18, 1964, the latter assigned to applicant's assignee.

The wide variety of signal types encountered in direction finders includes keyed carrier, FSK (frequency-shift keying), AM, FM, SSB and many others. With certain of these a severe disturbance problem exists stemming from the non-cooperating modulation characteristics of the received signal. System performance as a result is adversely affected in operating range, bearing sensitivity and in other respects. Further, the presence of this general disturbance has impeded the design of reliable automatic DF equipment as well as the reduction of the currently large antenna size.

Accordingly, a general object of the invention is to improve the performance of RF signal receiving systems relying on a Doppler effect.

A more specific object of the invention is to substantially enhance the Doppler frequency modulation of a Doppler RDF.

A further object of the invention is to eliminate the extraneous phase and frequency components in a Doppler RDF stemming from the received signal, but without sacrificing the enhancement of the Doppler component.

An added object of the invention is to reduce the cost and complexity of Doppler RDF's without degrading system performance.

These and other objects are achieved in accordance with the invention, broadly, by a signal-processing system utilizing a dual-channel RDF receiver or its equivalent, in which in the respective channels the frequency modulation (Doppler modulation) generated by the DF sampling is of opposite phase while the characteristic modulations (SSB, FM or other intelligence) of the received signal are in-phase for each channel respectively. After filtering, the signals from each receiver channel are processed in an offset-frequency mixer circuit, the output of which is a relatively low-frequency difference-signal carrier, characterized by Doppler-modulation.

In accordance with one facet of the invention, the mentioned difference signal is characterized by a Doppler-frequency modulation component enhanced by a factor of two, while the unusable, undesired modulation components of the received signals are cancelled.

Pursuant to a further facet of the invention, the offset frequency mixing occurs after the IF pre-selection stage; and hence, further processing of the signal does not affect the signal-to-noise ratio.

Importantly, by inserting a signal-multiplier stage in each offset-carrier channel prior to offset-frequency mixing, the Doppler component is still further enhanced while the received intelligence-modulation characteristics—although also multiplied—are again totally cancelled. Thus, in accordance with this facet of the invention, if the signal is multiplied five times, for example, before differencing, the Doppler component is 2 x 5 or 10 times greater than the received extraneous disturbance; in terms of relative Doppler signal strength, the described system represents an improvement of an order of magnitude over current single channel RDF receiver systems.

One feature of the invention, accordingly, resides in an arrangement in a dual-channel Doppler RDF for causing the DF frequency modulation to be of opposite phase in the two channels while the normal received intelligence modulations are in-phase, so that upon processing of the channel outputs in an offset frequency mixer circuit a difference output signal carrier frequency is produced in which the desired Doppler FM is enhanced by a factor of 2 while the extraneous modulation components in frequency and phase are cancelled.

A further feature of the invention concerns the frequency multiplying of the signals before performing the frequency differencing function, which further enhances the desired Doppler component and accordingly improves signal detection.

Other objects and further features of the invention will be pointed out or will occur to those skilled in the art from a reading of the following specification in conjunction with the accompanying drawing, which shows, for illustrative purposes only, a preferred form of the invention. In said drawing:

FIG. 1 is a schematic diagram suggestive of a physically rotating or of an effectively rotating receiving antenna system;

FIG. 2 is a schematic block diagram of a dual channel RDF embodying the inventive concepts; and FIGS. 3a and 3b are graphs illustrating one portion of the signal processing.

A generalized description of the workings of the inventive signal-processing technique will assist in understanding the later-described illustrative embodiment.

Consider a pair of antennas as in FIG. 1 designated 1 and 2 rotating about a common center 3 at an angular rate $\Omega$ radians/second. An unmodulated carrier signal incident on antennas 1, 2 can be described by the following idealized expressions:

(1) $$E_1 = E \cos\left(\omega t - \frac{2\pi R}{\lambda} \cos \Omega t\right)$$

(2) $$E_2 = E \cos\left(\omega t + \frac{2\pi R}{\lambda} \cos \Omega t\right)$$

where:

R = The radius of the antenna system;
$\omega$ = Carrier radian frequency; and
$\lambda$ = Wavelength of the received signal.

If these signals are processed through a dual-channel receiver or its equivalent, and then combined in offset frequency mixing circuit of the type that closely spaced frequencies ($\omega_1$, $\omega_2$) are respectively beat against the processed signals $E_1$, $E_2$, the following result is obtained for each channel:

(3) $$E_1 = E \cos\left(\omega_1 t - \frac{2\pi R}{\lambda} \cos \Omega t\right)$$

(4) $$E_2 = E \cos\left(\omega_2 t + \frac{2\pi R}{\lambda} \cos \Omega t\right)$$

where the terms $\omega_1$ and $\omega_2$ are the respective radian frequencies of the offset-conversion process. Now, combination of these signals in a frequency mixer results in the production of the following sum and difference signal components:

(5)
$$(\text{Sum Component})_1 = \left(\omega_2 t + \frac{2\pi R}{\lambda} \cos \Omega t\right) + \left(\omega_1 t - \frac{2\pi R}{\lambda} \cos \Omega t\right) = (\omega_2 + \omega_1)t$$

(6)
$$(\text{Difference Component})_1 = \left(\omega_2 t + \frac{2\pi R}{\lambda} \cos \Omega t\right) - \left(\omega_1 t - \frac{2\pi R}{\lambda} \cos \Omega t\right) = (\omega_2 - \omega_1)t + 2\left(\frac{2\pi R}{\lambda} \cos \Omega t\right)$$

As indicated by expression 6, the difference signal comprises a carrier signal at a frequency equal to the offset between frequencies $\omega_1$, $\omega_2$ but with a Doppler modulation which, in accordance with the invention, is double that of prior art systems.

If the signal incident on antennas 1, 2 is modulated at its source by FM or PM, for example, then in the absence the Doppler component produced by the antenna rotation the signals received by the respective antennas are described by the following relations:

(7) $E_3 = E \cos [\omega_1 t + m_f F(\omega_a t)]$
(8) $E_4 = E \cos [\omega_2 t + m_f F(\omega_a t)]$ where $m_f$ is the generalized modulation index and $F(\omega_a t)$ is a generalized modulation function. If now the signals described by Equations 7 and 8 are subjected to the same offset frequency mixing and combination techniques as applied to the signals described by Equations 1 and 2, then the sum and difference signal components are, respectively:

(9) (Sum Component)$_2 = (\omega_2 + \omega_1)t + 2m_f F(\omega_a t)$
(10) (Difference Component)$_2 = (\omega_2 - \omega_1)t$ And the difference signal expressed in 10 again involves the low frequency carrier signal ($\omega_2 - \omega_1$) but with the extraneous modulation cancelled. Pursuant to the invention, combination of the enhanced Doppler signal expressed in Equation 6 and the difference signal of Equation 10 results in a carrier signal with the Doppler modulation enhanced by a factor of two and with the extraneous source modulations (FM or PM) cancelled. As earlier noted, appropriate frequency multiplying of the signals occurring in the offset-carrier channels corresponding to the signals of antennas 1, 2, respectively, results in a substantial further Doppler enhancement while the disturbing signals remain cancelled.

FIG. 2 illustrates the practice of the invention within a working RDF framework. It is assumed for purposes of illustration that the incident signal upon the RDF is a modulated FM carrier, which may, for example, be in the range of 1 to 10 mc./s. The two antenna elements 1, 2 may be opposed elements of a fixed circular array of such elements being continuously swept by electronic-commutator techniques, and thus effectively rotated; however, for simplicity of present illustration, the antenna elements 1, 2 are shown to be carried for rotation on a shaft or support 3, continuously rotated by a motor 4, as suggested by an arrow. Antenna elements 1, 2 may be spaced several wavelengths at the RF carrier frequency and are separately electrically connected to receivers 5, 6 which comprise receiver channel 1 and receiver channel 2 respectively, through suitable means (not shown) such as slip rings. Receivers 5, 6 may be two separate receivers such as the military R390 type modified for coherent operation of conversion oscillation. Alternatively, receivers 5, 6 may comprise a single dual-channel commercial receiver such as the racal RA 2538. Receivers 5, 6 each comprise the usual RF amplification stage 7, mixer 8 and IF amplification stage 9.

Pursuant to this data processing, the signals in channels 1 and 2 are filtered in matched filter pair 10, 11 to suppress harmonics of the carrier and the associated side frequencies. Filter pair 10, 11 are, for example, characterized by a 3 db bandwidth of the order of 1.2 kc. and exhibit a phase matching of ±1.5 degrees within the passband.

The output signal from filter 10 contains the Doppler component expressed in Equation 1 as well as the modulated received signal expressed in Equation 7. Similarly, the output signal from filter 11 contains the Doppler component expressed in Equation 2 as well as the modulated received signal expressed in Equation 8. These signals occurring in the channels 1 and 2 are combined in offset frequency mixer 14 and the desired difference-frequency extraction (passing merely the relatively low-frequency carrier, $\omega_1 - \omega_2$, and its modulation) may be achieved by a filter 15 having a passband in the order of 5 kc./s. Mixer 14 is shown to include a generator 14' of the two offset frequencies $\omega_1$, $\omega_2$ for separate mixing in the two receiver channels. As already noted, the difference signals generated in mixer 14 and selected by filter 15 are described by Equation 6, inasmuch as differencing has eliminated the generalized modulation function, as indicated by Equation 10. The result, then, in accordance with the invention is a signal containing a carrier (in the order of 5 kc./s.) with the Doppler modulation enhanced by a factor of 2, and with extraneous modulations cancelled. This desired signal is conventionally detected in frequency detector 16 which is a pulse-count discriminator; and the DF data generated pursuant to the invention is applied to display means which may include a phase comparator 17.

Comparator 17 also receives an input from motor 4, for example, which determines the instantaneous effective antenna-response bearing. These input data to comparator 17 are handled in any one of several routine manners to produce an indication, shown schematically as a bearing meter 18, of the actual bearing of the Doppler-modulated carrier signal with respect to the point of reception.

Further substantial enhancement of the Doppler component is achieved if, as mentioned, the IF signals occurring after receiver selectivity are frequency-multiplied.

This may be achieved as illustrated in FIG. 2 by frequency multipliers 19, 20 which receive the output of limiters 12, 13 and, after multiplying, apply them to offset mixer 14.

To further illustrate the present signal-processing system, consider the general voice-modulated SSB signal represented in FIG. 3a. When this waveform is processed through the system shown in FIG. 2, a waveform such as shown in FIG. 3b results. Here, the SSB signal is composed of a series of square waves at the carrier IF, the phase of which is varying due to the speech pattern. The amplitude of these square waves goes to zero at the voice syllable and overtone format rate. Hence, the signal train that will be differenced (at 14–15) consists essentially of a constant-amplitude sequence of variable-phase axis crossings, with amplitude notches at the zero points. Pursuant to the invention, the phase perturbations during the limit period are substantially cancelled and the zero-point perturbation is minimized to a low-energy impulse function. Of course, the desired Doppler component is enhanced in the course of the processing.

The advantages of the described signal-processing technique are generally realized regardless of the nature of the incoming wave, and with respect to a Doppler-type RDF, the following advantages of the invention are clear and serve to summarize the advance. Doppler modulation is enhanced two-fold; the combining process uses two separate reception points and hence the $s/n$ ratio is increased potentially by about 3 db; since the Doppler component is enhanced after IF pre-selection, the further signal processing does not substantially affect the $s/n$ ratio; and if frequency multiplying is employed prior to offset-frequency mixing and before derivation of the difference-frequency component, a further relative Doppler enhancement (which may be in the order five-fold) may be achieved.

Although the invention has been described in connection with a particular illustrative embodiment, it will be understood that modifications can be made without departing from the spirit of the invention as defined in the claims to follow.

What is claimed is:

1. A receiver system for determining the bearing of a modulated signal source, comprising: means for receiving said modulated signal at each of two spaced points effectively rotating about a common center, said rotation producing at each point a Doppler modulation of the received signal opposite in phase at the two points; a receiver channel associated with each point for IF processing the respective oppositely phased Doppler signals and the normal in-phase received source signals; means for offset-frequency mixing both the oppositely phased Doppler signals occurring in each channel and the normal source modulations occurring in each channel; and means for combining and selecting the difference-frequency components of said offset-frequency mixing; whereby the resultant signal is characterized by an enhanced Doppler component with the source modulations cancelled.

2. A receiver system pursuant to claim 1 wherein each said channel further comprises means for frequency multiplying the signals occurring therein subsequent to IF processing but prior to offset-frequency mixing.

3. A receiver system pursuant to claim 2 wherein each said channel further comprises symmetrical limiting means respectively coupled in said channels subsequent to the IF processing stage but prior to said frequency multiplying means.

4. A receiver system in accordance with claim 3, further comprising means for sensing the effective rotational rate and position of said effectively rotating spaced points, means for comparing same to said enhanced Doppler component, and means for registering the result of such comparison in terms of a bearing.

5. A receiver system in accordance with claim 4, wherein the electrical distance between said two points is several wavelengths for the received signal.

6. A receiver system for determining the bearing of a modulated signal source comprising: signal receiving means having a directional response; means for effectively rotating the directional response of said receiving means about a center at a substantially uniform angular velocity; means for extracting from said receiving means first and second signals respectively comprising first and second oppositely phase Doppler-modulation components and also first and second in-phase normal modulated components from said source; means for frequency mixing said first components with a first offsetting frequency; means for frequency mixing said second components at a second offsetting frequency; and means for combining the products of such offset-frequency mixing, thereby to derive a difference-signal component having a phase related to said effective rotation in accordance with the desired bearing data.

7. In a dual-channel Doppler-type radio direction finder including rotating signal-receiving means, the improvement which comprises: means for causing the locally produced Doppler components to be of opposite phase in the respective channels and for causing the normal received modulations to be in-phase; means for frequency multiplying the signals occurring in each channel; means subsequent to said multiplying means for offset frequency mixing the signals occurring in the respective channels to generate a difference output signal carrier frequency characterized by a substantially enhanced Doppler component with extraneous frequency and phase components of the normal received moduations cancelled; and means for extracting from said enhanced Doppler component and said rotating signal receiving means the desired directional information.

8. A process for determining the bearing of a modulated carrier signal comprising the steps of separately receiving the carrier signal at each of two spaced locations which are effectively rotated about an axis therebetween to generate two separate local frequency modulations in opposed-phase relation while the phase of the modulated carrier signal itself received at said two rotating locations is the same; separately processing in a separate receiver channel the signals occurring at each of said rotating locations; separately mixing the respective receiver signal outputs at first and second mixing frequencies that characterized by a controlled offset from each other; combining the offset frequency-mixed signals to produce sum and difference frequency components, including a modulated component on a carrier represented by the offset of said mixing frequencies; extracting substantially only said modulated component and demodulating the same; and extracting from said demodulation and said revolving antenna an indication representative of said bearing.

9. A process in accordance with claim 8 including the further steps of frequency multiplying to the same degree the signals occurring in each of said channels prior to the offset frequency mixing step.

References Cited

UNITED STATES PATENTS 2,502,131   3/1950   Earp _____ 343—113

RODNEY D. BENNETT, *Primary Examiner.*

R. E. BERGER, *Assistant Examiner.*